(12) United States Patent
Pan et al.

(10) Patent No.: US 7,496,621 B2
(45) Date of Patent: Feb. 24, 2009

(54) METHOD, PROGRAM, AND APPARATUS FOR NATURAL LANGUAGE GENERATION

(75) Inventors: Shimei Pan, Armonk, NY (US); James Chi-Kuei Shaw, Tenafly, NJ (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 10/890,811

(22) Filed: Jul. 14, 2004

(65) Prior Publication Data
US 2006/0015324 A1 Jan. 19, 2006

(51) Int. Cl.
*G06G 7/00* (2006.01)
(52) U.S. Cl. .............................. 708/800; 704/9; 704/7; 704/1
(58) Field of Classification Search ............... 704/1–10, 704/257, 277, 251; 708/800
See application file for complete search history.

(56) References Cited

U.S. PATENT DOCUMENTS 6,965,856 B1 * 11/2005 Stuermer ....................... 704/1

OTHER PUBLICATIONS

Bangalore, et al., "Exploiting a Probabilitistic Hierarchical Model for Generation", Proc. of the Coling, 2000, 42-48.
Langkilde, et al., "Generation that Exploits Corpus-Based Statistical Knowledge," Proc. of the Coling and the ACL, Montreal Canada, 1998, 704-710.
Oberlander, et al., "Stochastic test generation," Philosophical Transactions of the Royal Society of London, Series A, 358, 2000, 1373—1385.
Ratnaparkhi, A., "Trainable Methods for Surface Natural Language Generation," Proc. of NAACL, Searttle, WA, 2000, 194-201.
Robin, et al., "Corpus Analysis for Revision-Based Generation of Complex Sentences," Proc. of AAAI, Washington, DC 1993.
Shaw, J., "Clause Aggregation Using Linguistic Knowledge," Proc. of IWNLG, 1998.
Varges, et al., "Instance-based Natural Language Generation," Proc of the NAACL, Proc of the NAACL, Pittsburgh, PA, 2001.
Walker, et al., "SPoT: A Trainable Sentence Planner," Proc. of NAACL, 2001.

* cited by examiner

*Primary Examiner*—Huyen X. Vo

(57) ABSTRACT

One embodiment of the present method, program, and apparatus for natural language generation enables a language generation system to generate a grammatically correct natural language sentence by retrieving and adapting one or more stored sentences having semantic features similar to semantic features of a system-generated semantic representation. The retrieval of stored sentences is guided at least in part by the ease with which the stored sentences may be adapted to produce a grammatically correct sentence, enabling rapid generation of accurate output.

25 Claims, 9 Drawing Sheets

METHOD, PROGRAM, AND APPARATUS FOR NATURAL LANGUAGE GENERATION

BACKGROUND

The present invention relates generally to language generation systems, and relates more particularly to a method and apparatus for natural language generation.

Many modern interactive applications employ natural language generation systems, e.g., in order to formulate responses to user queries. For example, a user may interact with an automated, telephone-based airline ticketing system by asking the system, e.g., via an oral query, "What flights are available tomorrow from New York to Boston?". The system then generates a response to the user's query in a form that the user can readily interpret, e.g., in a natural language format. Other systems may generate natural language output without a direct user prompt, such as systems that automatically generate periodic output according to a schedule.

Conventional language generation systems are subject to several shortcomings. For example, template-based systems, while easy to develop, produce only a limited variety of responses. Rule-based systems, though more versatile than template-based systems, require developers with linguistic sophistication to develop and maintain the systems. The performance of conventional statistics-based systems is closely tied to the volume of available examples in a database. A common shortcoming among all of these systems is that none is able to consistently and rapidly produce a large variety of grammatically correct output or sentences, making the systems less user-friendly.

Thus, there is a need in the art for a method and apparatus for natural language generation.

SUMMARY OF THE INVENTION

One embodiment of the present method, program, and apparatus for natural language generation enables a language generation system to generate grammatically correct natural language output by retrieving one or more stored sentences having semantic features similar to semantic features of a system-generated semantic representation, where the retrieval of the stored sentences is guided at least in part by the ease with which the stored sentences may be adapted to produce grammatically correct output sentences. The retrieval of the stored sentences includes comparing a semantic representation of one of the stored sentences with the system generated semantic representation in order to assess a degree of similarity therebetween, where the degree of similarity is assessed by computing a similarity measure based on a distance between all propositions contained in the semantic representation of the stored sentence and all propositions contained within the system-generated semantic representation. Propositions in the semantic representation that differ from propositions in the system-generated semantic representation are identified. In addition, one or more adaptation operators that may be applied to the stored sentence to produce a grammatically correct output sentence are identified. An adaptation cost representing a likelihood that application of the adaptation operator(s) to the stored sentence will produce a grammatically correct sentence is calculated, and if the adaptation cost meets a predefined criterion, the stored sentence is added to a list of retrieved sentences. The adaptation operator(s) is then applied to one or more of the retrieved sentences in order to modify the retrieved sentence(s).

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for natural language generation. Embodiments of the present invention enable the rapid generation of grammatically correct natural language sentences, e.g., for natural language responses to user queries. The method virtually "learns" natural language, e.g., in the manner a human would, by observing and analyzing grammatical relationships in training examples (e.g., sentences) and by storing adapted examples for future use. Over time, accurate, grammatically correct output is generated more quickly and more efficiently.

Figure 1:
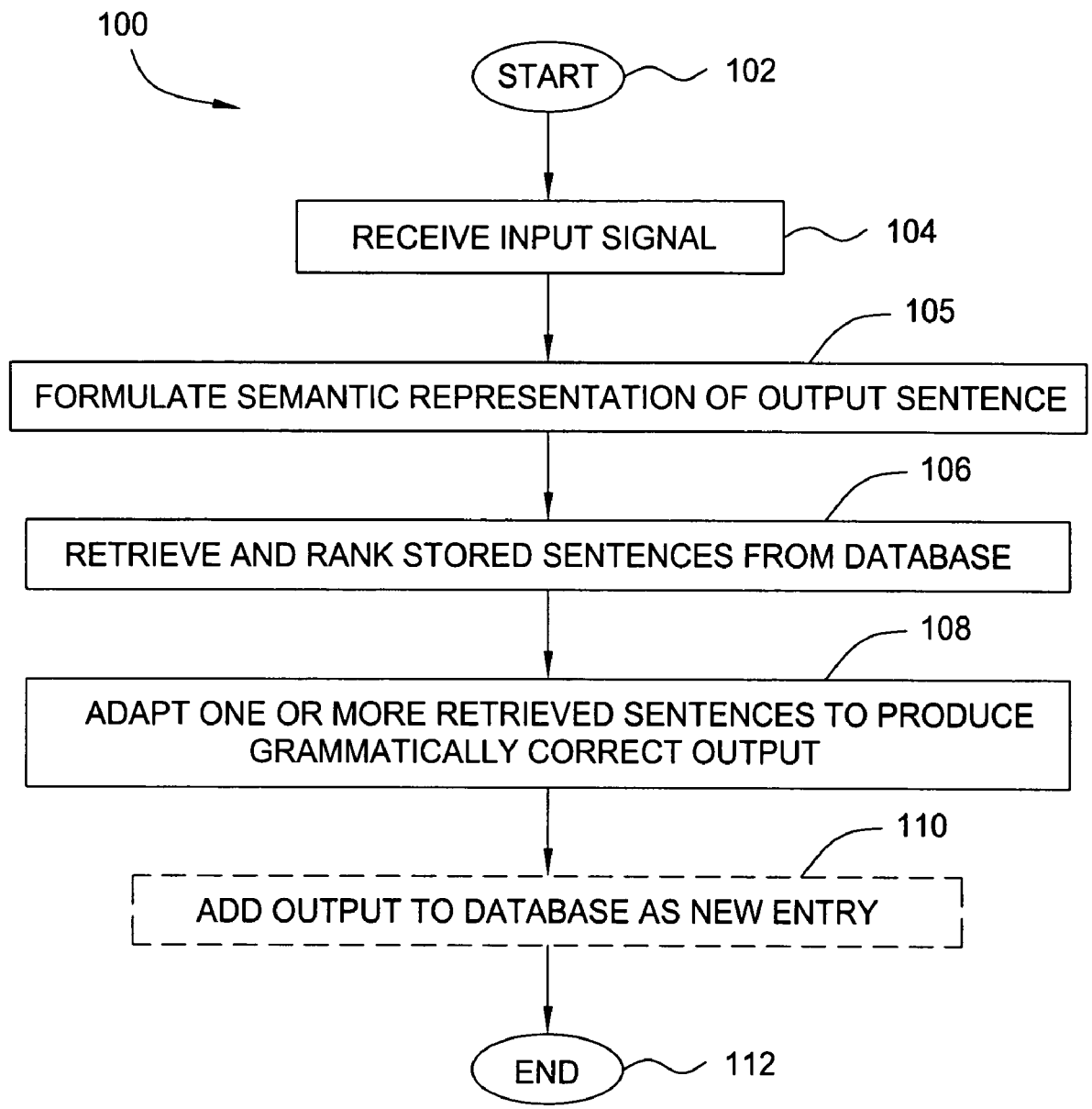
FIG. 1 is a flow diagram illustrating one embodiment of a method for generating natural language output according to the present invention.

FIG. 1 is a flow diagram illustrating one embodiment of a method 100 for generating natural language output according to the present invention. The method 100 is initialized at step 102 and in one embodiment proceeds to step 104, where the method 100 receives an input signal from a user, e.g., in the form of a spoken or written query. In some embodiments, e.g., where periodic output is automatically generated by a system, user input may not be explicitly received each time the method 100 is initialized (e.g., the input may be a static input or request received at a point earlier in time).

The method 100 then proceeds to step 105 and formulates a semantic representation (e.g., a semantic input) for an output sentence that is responsive to or reflects the input signal. The method 100 transforms the formulated semantic representation into a response comprising one or more grammatically correct sentences, e.g., in accordance with the steps described in further detail below.

In step 106, the method 100 retrieves stored sentences from a system database. These retrieved sentences represent "training examples" that the method 100 identifies as being potentially useful in the generation of natural language output. In one embodiment, each sentence stored in the database is associated with a semantic representation of the sentence and a realization tree representing the corresponding syntactic lexical representation. In this embodiment, the method 100 compares the system-formulated semantic representation (e.g., formulated in step 105) with the semantic representations of the stored sentences to generate a ranked list of sentences whose semantic representations are similar to the system-formulated semantic representation. In one embodiment, retrieval of stored sentences is influenced by the ease with which the stored sentences may be adapted to produce a grammatically correct output sentence, and the ranking of the sentences reflects this concept, as described in further detail below. In one embodiment, the number of sentences in the database increases with the complexity of the system-generated semantic representation and desired output. In one embodiment, the number of sentences in the database is empirically determined.

In one embodiment, the similarity between the system-generated semantic representation and the semantic representation of a retrieved sentence is assessed by computing the overlap of concepts in the two semantic representations, or by computing a similarity measure based on the distance between all pairs of propositions in the two semantic representations, as described in further detail with reference to FIG. 3.

In step 108, the method 100 adapts or modifies one or more of the sentences retrieved in step 108 in order produce natural language output. In one embodiment, the retrieved sentences are adapted by identifying and applying an adaptation operator to the realization trees for each retrieved sentence, as described in further detail with reference to FIGS. 5-8. In one embodiment, adaptation operators as described below are applied in sequence, with an order of operators being influenced by the likelihood that application of a particular operator will produce a grammatically correct sentence.

In one embodiment, the method 100 then proceeds to optional step 110 and saves the natural language output produced in step 108 in the system database, e.g., as a new stored (e.g., "training") sentence to be used for subsequent natural language generation processes. In one embodiment, the output is saved if the adaptations made to an existing stored sentence in order to produce the output are not trivial. In one embodiment, an adaptation is considered not trivial if either a deletion or an insertion operator is applied to the stored sentence, as described in further detail below. In one embodiment, the output is first stored in a temporary database, and manual tests are periodically run against the output stored in the temporary database to ensure fluency and grammatical correctness before the output is stored in a permanent database. By saving output for future use, the method 100 is able to learn, dynamically, from past operations, enabling faster and more accurate future results. Furthermore, a smaller initial database is required to train the method 100 than is required for conventional data-driven natural language generation systems. The method 100 then terminates in step 112.

Figure 2:
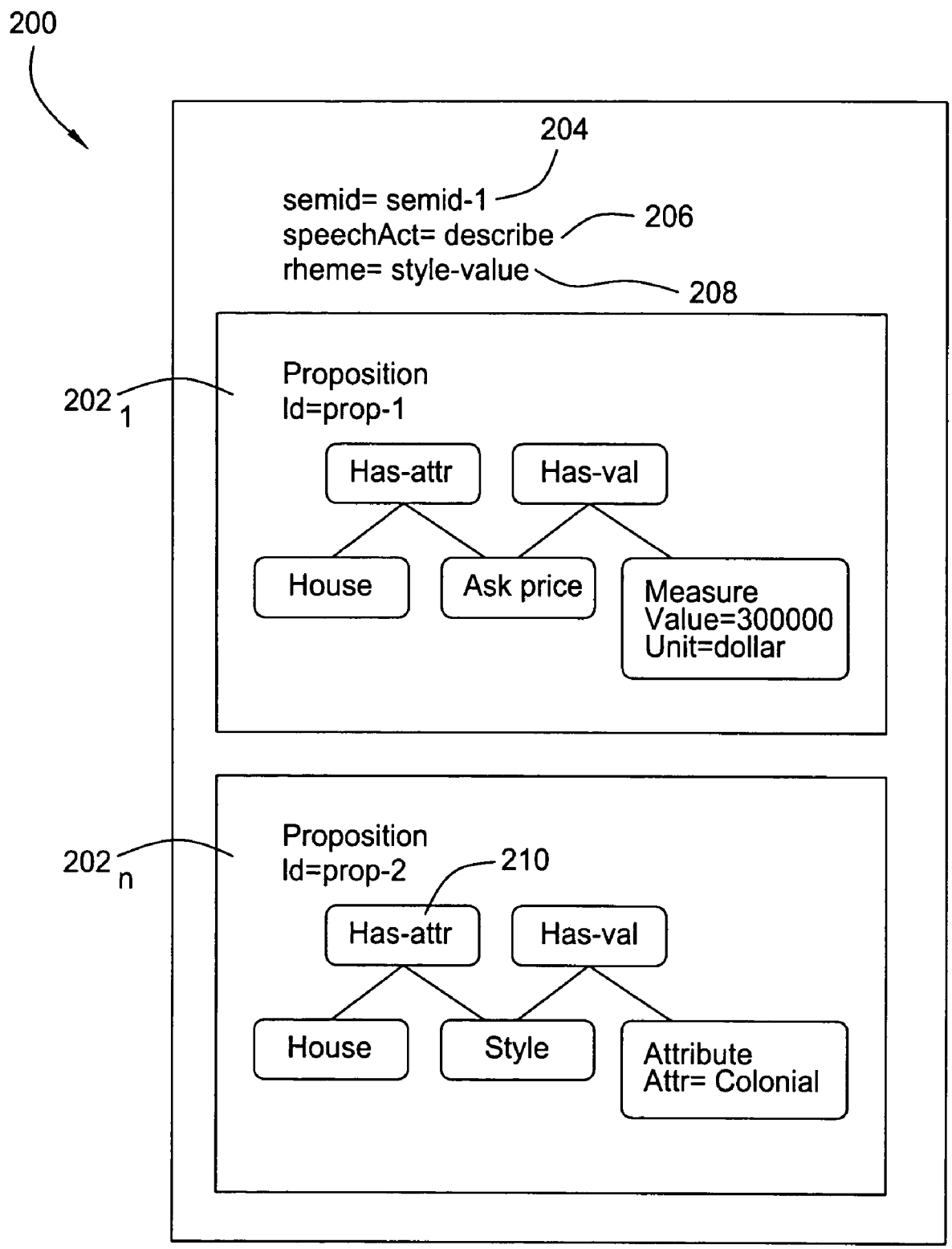
FIG. 2 is a schematic illustration of one embodiment of a semantic representation for use in the method.

FIG. 2 is a schematic illustration of one embodiment of a semantic representation 200 for use in the method 100. The semantic representation 200 represents the exemplary sentence, "The 300,000 dollar house is a Colonial". In one embodiment, the semantic representation 200 contains one or more propositions $202_1$ and $202_n$ (hereinafter collectively referred to as "propositions 202"). Each proposition 202 represents a roughly clause-sized piece of information (e.g., proposition $202_1$ represents the fact that the house has an asking price of 300,000 dollars, and proposition $202_n$ represents the fact that the style of the house is Colonial). In one embodiment, the semantic representation 200 further includes identification (e.g., "semid" 204) speech act (e.g., "speechAct" 206) and theme/rheme (e.g., "rheme" 208) information. In one embodiment, semantic representations such as the semantic representation 200 support the computation of similarity measures in the retrieval step (e.g., step 106) of the method 100.

Figure 3:
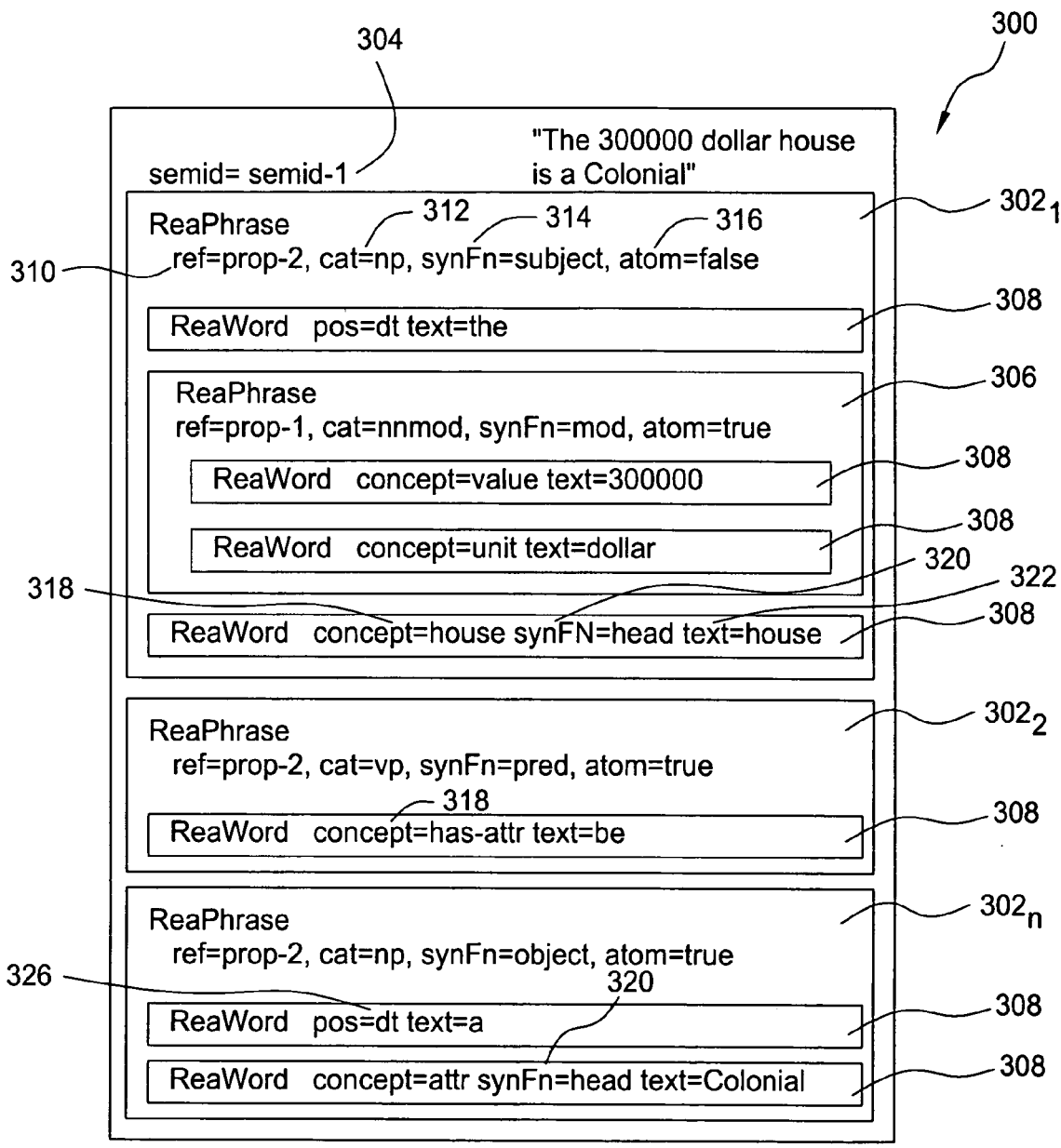
FIG. 3 is a schematic illustration of one embodiment of a realization tree corresponding to the semantic representation illustrated in FIG. 2.

FIG. 3 is a schematic illustration of one embodiment of a realization tree 300 corresponding to the semantic representation 200 illustrated in FIG. 2. The realization tree 300 includes a semantic representation identification (e.g., "semid" 304) and one or more recursive phrase structures or realization phrases (e.g., ReaPhrases) $302_1$, $302_2$ and $302_n$ (hereinafter collectively referred to as "realization phrases 302"). The semantic representation identification 304 establishes a correspondence between a semantic representation (e.g., semantic representation 200) and the realization tree 300 (e.g., in FIGS. 2 and 3, semantic representation 200 and realization tree 300 share the same "semid" value, "semid-1"). In one embodiment, realization trees such as the realization tree 300 support the modification of retrieved sentences in the adaptation step (e.g., step 108) of the method 100.

Each realization phrase 302 corresponds to a syntactic phrase that, in turn, includes one or more recursive realization phrases 306 and/or realization words (e.g., "ReaWords") 308. In one embodiment, each realization phrase 302 is characterized by four main attributes: reference (e.g., "ref" 310), syntactic category (e.g., "cat" 312), syntactic function (e.g., "synFn" 314) and atomicity (e.g., "atom" 316). The reference attribute 310 refers to a specific proposition (e.g., propositions 202) in the corresponding semantic representation (e.g., semantic representation 200). For example, the reference attribute 310 in the realization phrase $302_1$ refers to "prop-2", or proposition $202_n$ in the semantic representation 200.

The syntactic category attribute 312 indicates the part of speech (e.g., noun phrase, adjective phrase, etc.) that the corresponding realization phrase 302 is realized as. For example, the syntactic category attribute 312 for the realization phrase $302_1$ indicates that the realization phrase $302_1$ is realized as an "np", or noun phrase.

The syntactic function attribute 314 indicates whether the corresponding realization phrase 302 is a subject, a predicate, an object, a complement or a modifier. For example, the syntactic function attribute 314 for the realization phrase $302_1$ indicates that the realization phrase $302_1$ is a subject.

The atomicity attribute 316 indicates whether the corresponding realization phrase 302 realizes only one proposition (e.g., a proposition 202), or whether the realization phrase 302 is a composition of multiple propositions. In one embodiment, an atomicity attribute 316 that specifies "true" indicates that the corresponding realization phrase 302 only expresses the proposition indicated by the realization phrase's reference attribute 310. An atomicity attribute 316 that specifies "false" indicates that the corresponding realization phrase 302 expresses multiple propositions. For example, the atomicity attribute 316 for the realization phrase $302_1$ specifies "false", indicating that the entire realization phrase $302_1$ expresses, in addition to the realization phrase 306 indicating "prop-1", other realization phrases 308 and realization words 306.

In one embodiment, each realization word 308 contained within a realization phrase 302 is characterized by one or more of three main attributes: concept (e.g., "concept" 318), syntactic function (e.g., "synFn" 320) and text (e.g., "text" 322). The concept attribute 318 refers to a particular semantic relation or concept in the corresponding proposition. For example, the concept attribute 318 of the realization word 308 contained within the realization phrase $302_2$ refers to the "Has-attr" concept 210 in proposition $202_n$ of the semantic representation 200.

The syntactic function attribute 320 indicates whether the corresponding realization word 308 is the head of the realization phrase 302 to which the realization word 308 belongs. For example, the syntactic function attribute 320 of the second realization word 308 within the realization phrase $302_n$ indicates that the realization word 308 is the head ("synFn=head") of the realization phrase $302_n$.

The text attribute 322 represents the surface string used to realize the corresponding concept attribute 318. For example, the text attribute 322 of the realization word 308 contained within the realization phrase 3022 indicates that the surface string "be" is used to realize the "has-attr" concept 210 in the proposition $202_n$ to which the realization word 308 relates.

In some embodiments, realization words 308 are also characterized by a fourth attribute 326 indicating the part of speech that the corresponding realization word 308 is realized as.

Figure 4:
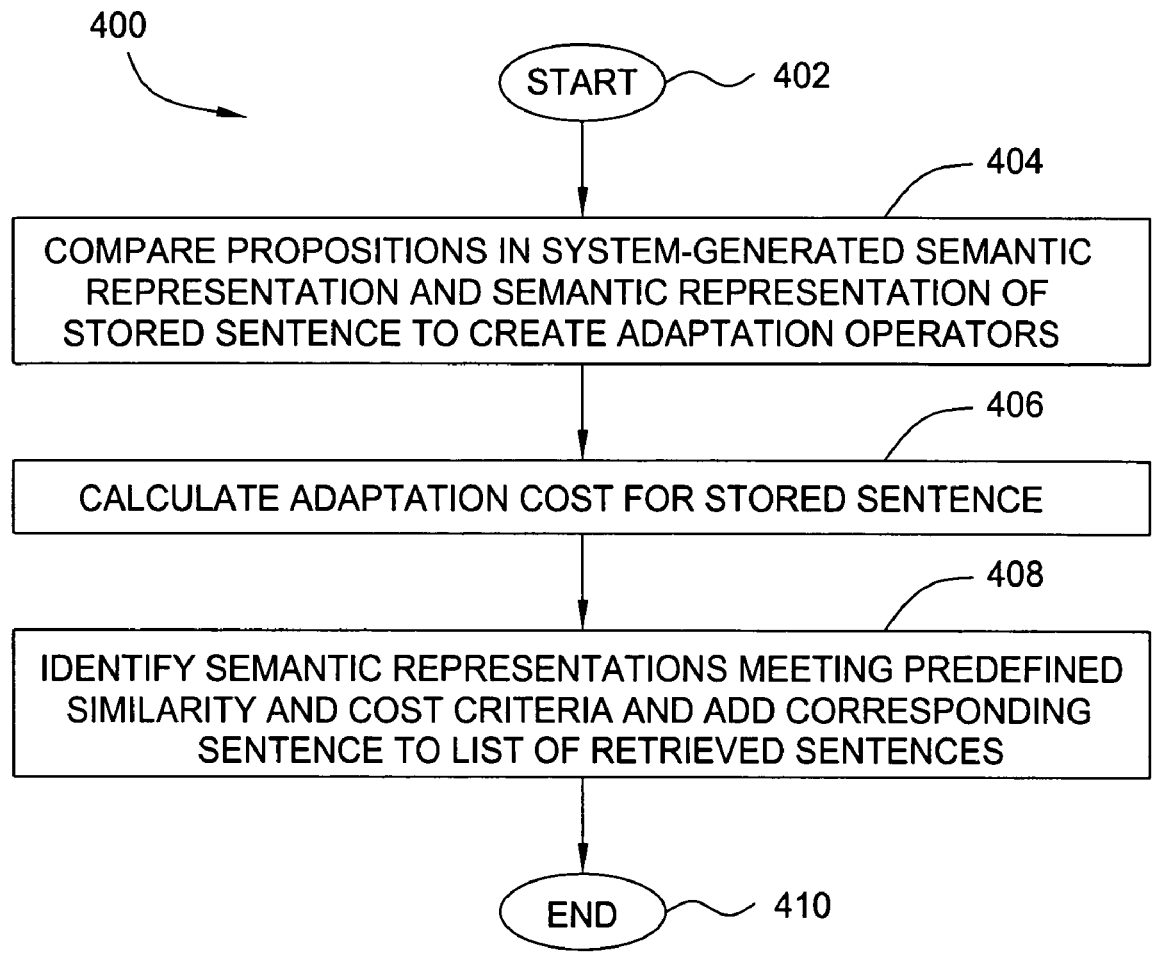
FIG. 4 is a flow diagram illustrating one embodiment of a method for computing a similarity measure between a semantic representation of an input signal and a semantic representation of a stored sentence, in accordance with the method illustrated in FIG. 1.

FIG. 4 is a flow diagram illustrating one embodiment of a method 400 for computing a similarity measure between the system-generated semantic representation (e.g., as formulated in step 105 of the method 100) and a semantic representation of a stored sentence, e.g., in accordance with step 106 of the method 100. That is, the method 400 identifies stored sentences that should be retrieved by the method 100 for use in formulating natural language output. Generally, the method 400 accomplishes this by computing a distance between all propositions (e.g., propositions 202 in FIG. 2) in the system-generated semantic representation and the stored sentence's semantic representation. In one embodiment, adaptation knowledge representing the adaptability of the stored sentence is also considered in retrieving stored sentences.

The method 400 is initialized at step 402 and proceeds to step 404, where the method 400 compares the propositions in the system-generated semantic representation to propositions in the semantic representation of a stored sentence. By identifying which propositions are the same and which are different, the method 400 is then able to create one or more adaptation operators for the stored sentence. The adaptation operators specify the manner in which the stored sentence should be modified in order to generate a grammatically correct natural language sentence as output.

In one embodiment, the method 400 assigns one or more of four possible adaptation operators to the stored sentence: null, substitution, deletion or insertion. In one embodiment, these operators correspond to rule- or statistics-based operations. A null operator indicates that the system-generated semantic representation and the semantic representation for the stored sentence have the exact same set of propositions. A substitution operator indicates that two propositions (e.g., one associated with the system-generated semantic representation and one associated with the stored sentence) have the same relation, but that these relations have different values. For example, while the proposition $202_1$ of the semantic representation 200 (which, for argument's sake, corresponds to a stored sentence) indicates that the specified house has an asking price of "$300,000", a system-generated semantic representation may indicate that the output sentence should specify an asking price of "$400,000". Thus, the stored phrase would need to be modified to reflect the desired output.

A deletion operator indicates that the semantic representation associated with the stored sentence includes a specified proposition, but that the system-generated semantic representation does not include this proposition. An insertion operator indicates that the system-generated semantic representation includes a specified proposition, but that the semantic representation associated with the stored sentence does not include this proposition.

In step 406, the method 400 calculates the adaptation cost for the stored sentence. The adaptation cost represents the ease with which the stored sentence may be adapted to produce grammatically correct output (e.g., the cost is an estimation of the likelihood that application of the specified adaptation operators to the stored sentence will produce grammatically correct output in an efficient manner). Because the stored sentences that are most similar (e.g., based on semantic or propositional overlapping) to the system-generated semantic representation may not be the most useful or the easiest sentences to adapt (e.g., due to complex sentence structures), execution of step 406 optimizes the sentence retrieval process by retrieving sentences that are most likely to be successfully adapted. In one embodiment, a predefined threshold represents a maximum adaptation cost such that any stored sentences having adaptation costs that exceed the threshold are not retrieved.

In one embodiment, the method 400 assigns an adaptation cost of zero to a sentence that has been assigned a null operator. In one embodiment, the method 400 assigns a relatively low adaptation cost to a sentence that has been assigned a substitution operator, since the overall sentence structure and the grammaticality of the resultant sentence is typically substantially preserved. In one embodiment, the method 400 assigns a relatively high adaptation cost to a sentence that has been assigned a deletion operator, since syntactic constituents are removed from the stored sentence's realization tree, potentially resulting in a grammatically incorrect sentence. In one embodiment, the method 400 assigns the highest adaptation cost to a sentence that has been assigned an insertion operator, since multiple sentences are involved in the adaptation, increasing the likelihood that the resultant sentence will not be grammatically correct. Thus, by assigning low adaptation costs to adaptation operators that are more likely to produce grammatically correct results, the method 400 becomes adaptation guided and maximizes its ability to produce the desired results.

In another embodiment, the method 400 assigns a high adaptation cost if the proposition realized by the main syntactic structure of the stored sentence is not present in the system-generated semantic representation. That is, a retrieved sentence may be fairly similar, semantically, to the system-generated semantic representation, but the differences, however seemingly slight, may make grammatically correct adaptation of the stored sentence difficult. This situation is particularly pronounced, for instance, when the proposition realizing the main structure of the retrieved sentence's realization tree needs to be deleted for adaptation, making it difficult to produce grammatically correct output.

For example, if the system-generated semantic representation corresponding to the sentence, "The {1995} house is a {Colonial}", and a retrieved sentence from the database is, "The {1995} {Colonial} house is {in Ardsley}", the house attribute "located-in-city" does not exist in the system-generated semantic representation. Thus, in one embodiment, the method 400 would typically delete the realization phrases that express this information in the realization tree of the retrieved sentence. However, in this specific case, applying the deletion operator to the retrieved sentence's realization tree would remove both the verb "is" and the complement "in Ardsley", rendering the resultant sentence incomplete, e.g., "The 1995 Colonial house". Thus, by assigning high adaptation costs to retrieved sentences that do not share a main syntactic structure with the system-generated semantic representation, the chances of producing grammatically incorrect output, e.g., by deleting main verbs as illustrated, can be significantly minimized.

Figure 5:
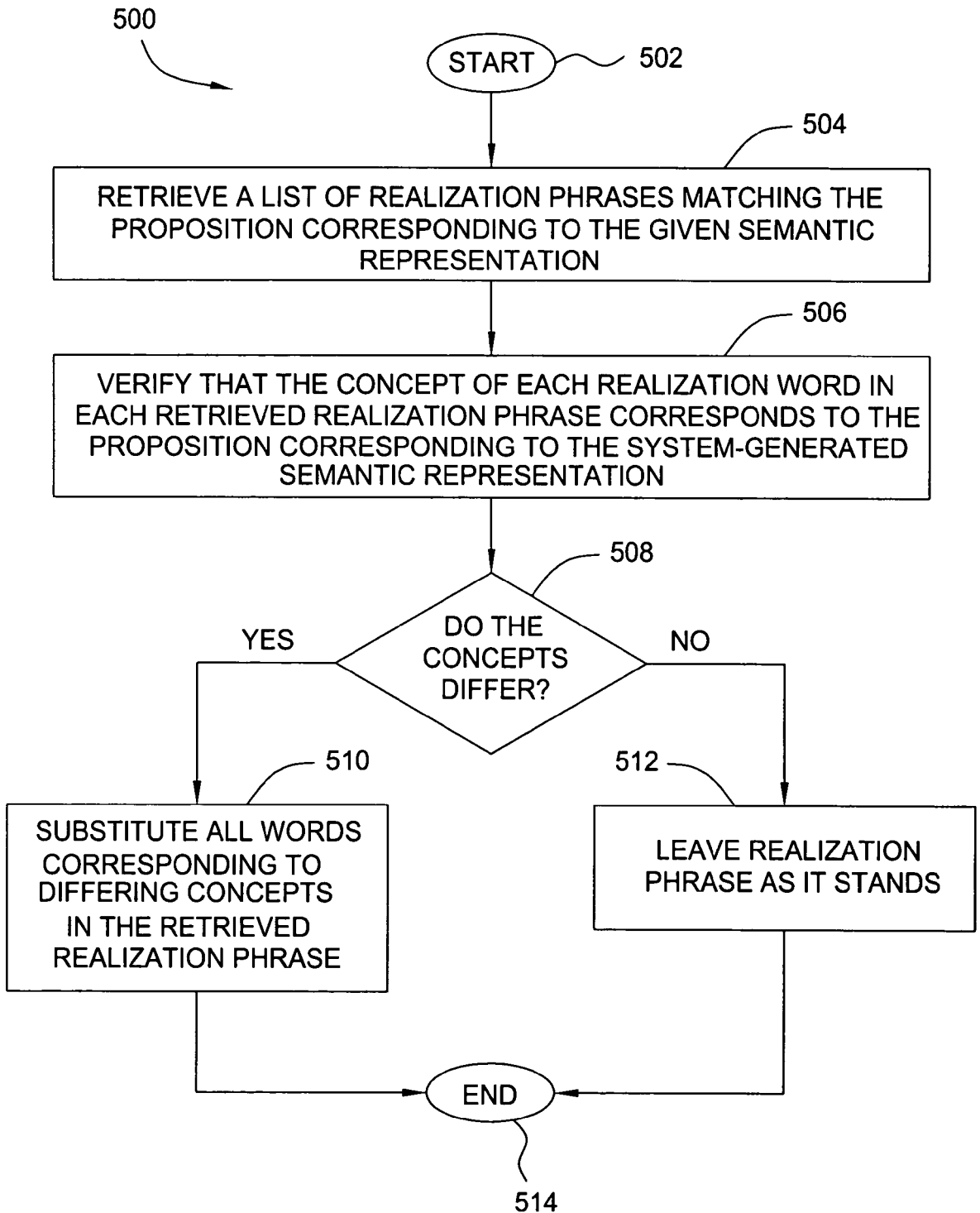
FIG. 5 is a flow diagram of one embodiment of a method for adapting a retrieved sentence by applying a substitution operator.

FIG. 5 is a flow diagram of one embodiment of a method 500 for adapting a retrieved sentence, e.g., by applying a substitution operator. The method 500 is initialized at step 502 and proceeds to step 504, where the method 500 examines a proposition from the system-generated semantic representation and a corresponding proposition from the semantic representation of a retrieved sentence. Specifically, in step 504, the method 500 retrieves a list of realization phrases matching the proposition in the system-generated semantic representation, e.g., using the reference attribute in the retrieved phrase's realization tree.

In step 506, the method 500 examines each realization word in a retrieved realization phrase to verify that the concept attribute for each realization word corresponds to or is the same as a concept in the proposition in the system-generated semantic representation. In step 508, the method 500 asks whether the concept attributes for one or more realization words in the retrieved realization phrase differ from the concepts expressed in the proposition of the system-generated semantic representation.

If the method 500 concludes in step 508 that the concept attribute for a realization word in the retrieved realization phrase does differ from the concept expressed in the system-generated semantic representation's proposition, the method 500 proceeds to step 510 and applies a substitution operator that is appropriate for the particular concept to the realization word. (e.g., as in the case substituting "$400,000" for the asking price of "300,000" described above). Once all realization words having differing concept attributes are substituted in this manner, the realization phrase containing the substituted realization words will convey the information expressed in the proposition of the system-generated semantic representation.

Alternatively, if the method 500 concludes in step 508 that none of the concept attributes for the realization words in the retrieved realization phrase differ from the concept expressed in the system-generated semantic representation's proposition, the method 500 proceeds to step 512 and leaves the realization phrase as it stands (e.g., no substitution is required, or a null operator is applied). The method 500 then terminates in step 514.

Figure 6:
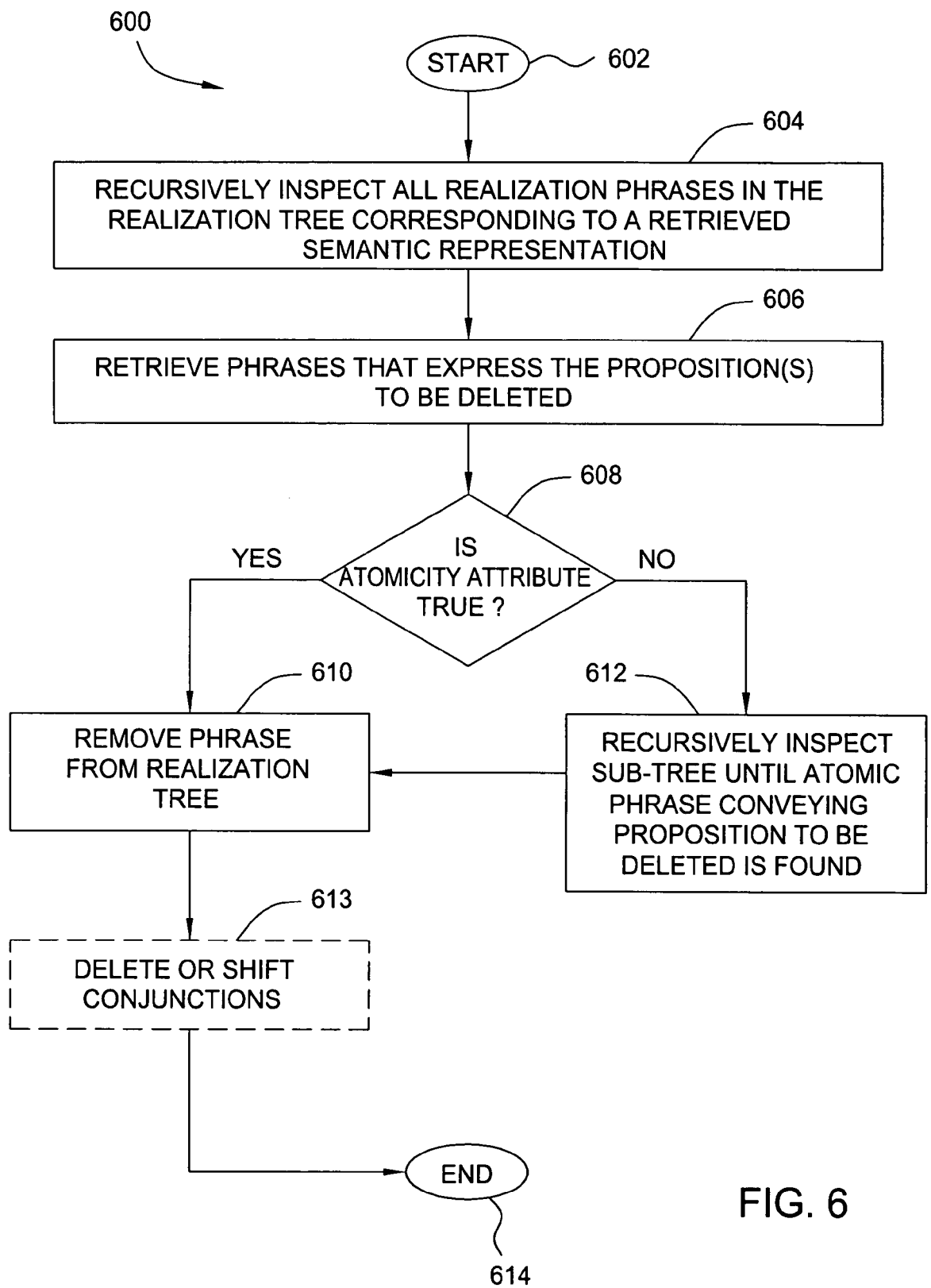
FIG. 6 is a flow diagram of one embodiment of a method for adapting a retrieved sentence by applying a deletion operator.

FIG. 6 is a flow diagram of one embodiment of a method 600 for adapting a retrieved sentence, e.g., by applying a deletion operator. In one embodiment, the method 600 is a type of reverse aggregation process for the deletion of hypotactic constructions, e.g., involving subordinate or modifying constructions like adjective and propositional phrases. The method 600 is initialized at step 602 and proceeds to step 604, where the method 600 recursively inspects all realization phrases in a realization tree corresponding to a semantic representation of a retrieved sentence.

In step 606, the method 600 retrieves, from the inspected realization trees, one or more realization phrases that express the proposition(s) to be deleted. In one embodiment, this is accomplished by analyzing the reference attribute within each realization phrase to determine with which proposition the realization phrase is associated.

In step 608, the method 600 inquires whether the atomicity attribute for a realization phrase retrieved in step 606 is "true". If the atomicity attribute is "true", e.g., the realization phrase expresses only the proposition indicated in the reference attribute, then the method 600 proceeds to step 610 and removes the realization phrase from the realization tree.

Alternatively, if the method 600 concludes in step 608 that the atomicity attribute is not "true", the method 600 proceeds to step 612 and recursively inspects the subtree (e.g., the recursive realization phrases 306 and/or realization words 308 illustrated in FIG. 3) until an atomic realization phrase conveying the proposition to be deleted is found. The method 600 then proceeds to step 610 and deletes the atomic realization phrase from the realization tree.

In one embodiment, the method 600 is adaptable for the deletion of paratactic constructions. In this embodiment, the method 600 includes an optional step 613 (illustrated in phantom), wherein the method 600 deletes or shifts conjunctions such as "and" and "or" in the realization tree, so that the conjunctions appear in grammatically correct positions in the resultant adapted sentence. The method 600 then terminates in step 614.

Figure 7:
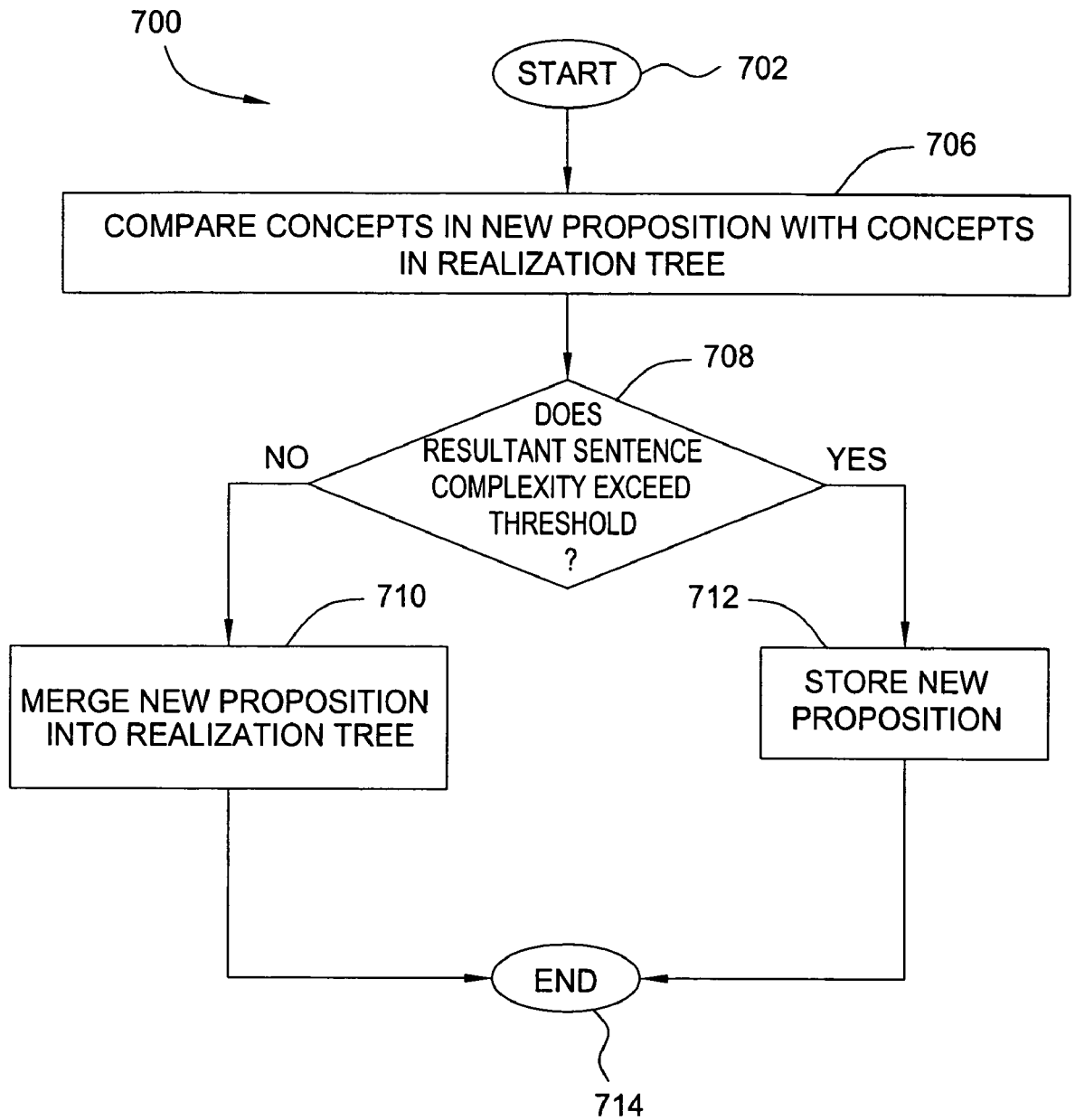
FIG. 7 is a flow diagram of one embodiment of a method for sentence boundary determination according to the present invention.

FIG. 7 is a flow diagram of one embodiment of a method 700 for sentence boundary determination (e.g., for use in applying insertion operators). In one embodiment, the method 700 is an aggregation operation. The method 700 is initialized at step 702 and proceeds to step 706 and compares concepts in a proposition contained in the system-generated semantic representation to the concept attributes expressed by the realization phrases in a realization tree of a retrieved sentence.

In step 708, the method 700 inquires if the complexity of the resultant sentence would exceed a predefined complexity threshold. In one embodiment, the threshold defines sentence boundaries, such as a maximum number of propositions or words that may be contained within a single output sentence.

If the method 700 concludes in step 708 that the resultant sentence would not exceed the predefined complexity threshold, the method 700 proceeds to step 710 and merges the "new" proposition (e.g., the proposition contained in the system-generated semantic representation) into the realization tree of the retrieved sentence. In one embodiment, the new proposition is merged using quantification (e.g., "THREE houses are Colonials. ONE is a Tudor") or a simple conjunction operator (e.g., "The names of the school districts are Lakeland School District AND Panas School District").

Alternatively, if the method 700 concludes in step 708 that the resultant sentence would exceed the predefined complexity threshold, the method 700 proceeds to step 712 and stores the new proposition, e.g., for use in the realization of a separate sentence (e.g., the output will comprise multiple sentences). The method 714 then terminates in step 714.

Figure 8:
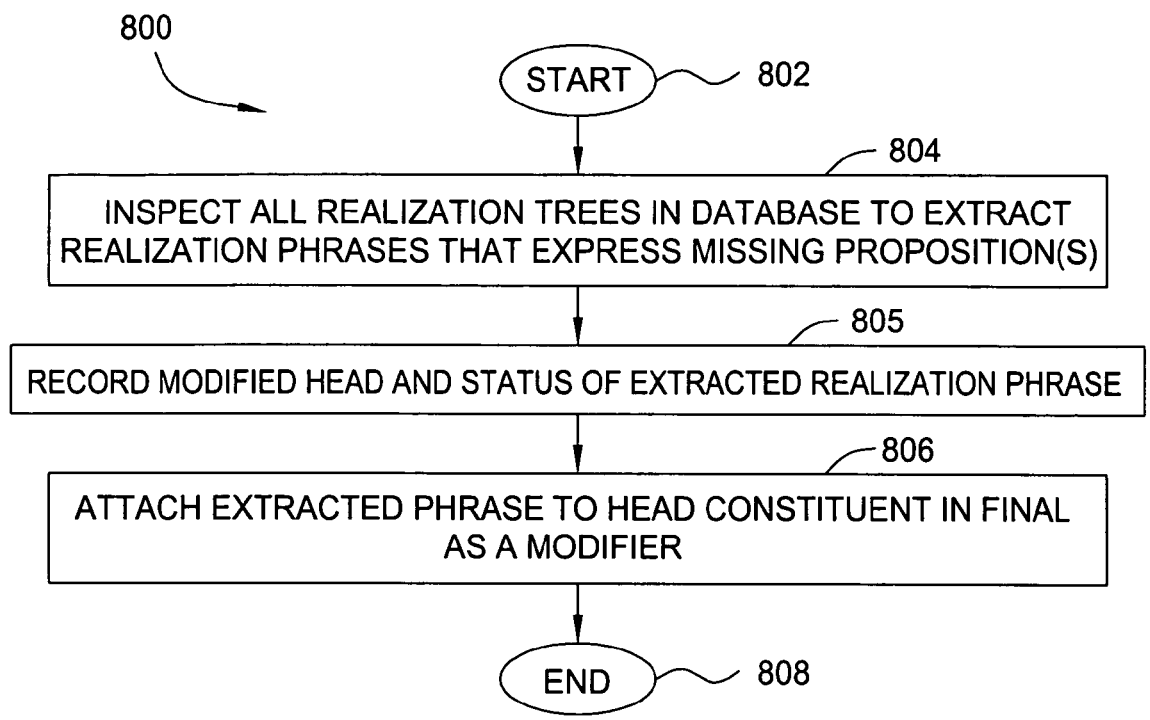
FIG. 8 is a flow diagram of one embodiment of a method for adapting a retrieved sentence by applying a hypotactic insertion operator.

FIG. 8 is a flow diagram of one embodiment of a method 800 for adapting a retrieved sentence, e.g., by applying a hypotactic insertion operator. In one embodiment, the method 800 is an aggregation operation. The method 800 is initialized at step 802 and proceeds to step 804, where the method 800 inspects all realization trees in the database and extracts realization phrases that express the "missing" proposition(s), e.g., the proposition(s) to be inserted into a given retrieved sentence to produce grammatically correct output. In one embodiment, step 804 further comprises applying a substitution operation to each of the extracted realization phrases in order to measure the length of each realization phrase before selecting a shortest candidate (e.g., to use in the generation of a concise output sentence).

In step 805, the method 800 records the heads (e.g., a realization phrase's core construction, such as the noun in a noun phrase or the verb in a verb phrase) that are modified by the extracted realization phrases, together with the status of the realization phrase (e.g., whether the realization phrase is used as a pre-modifier or a post-modifier with regard to the head).

In step 806, the method 800 attaches a realization phrase extracted in step 804 to the head constituent in the realization phrase being adapted. The method 800 uses the information recorded in step 805 to determine whether the extracted phrases that are attached in step 806 should be attached as pre-modifiers or post-modifiers with regard to the head of the realization phrase being adapted.

The method 800 is therefore simpler and less-error prone than conventional rule-based hypotactic transformation processes, which typically transform the missing propositions into modifying constructions through a complex and sometimes domain-dependent lexical process. The method 800 replaces this transformation step with an extraction process (e.g., step 804) that identifies modifying constructions in the database, which is much simpler and much more reliable.

Figure 10:
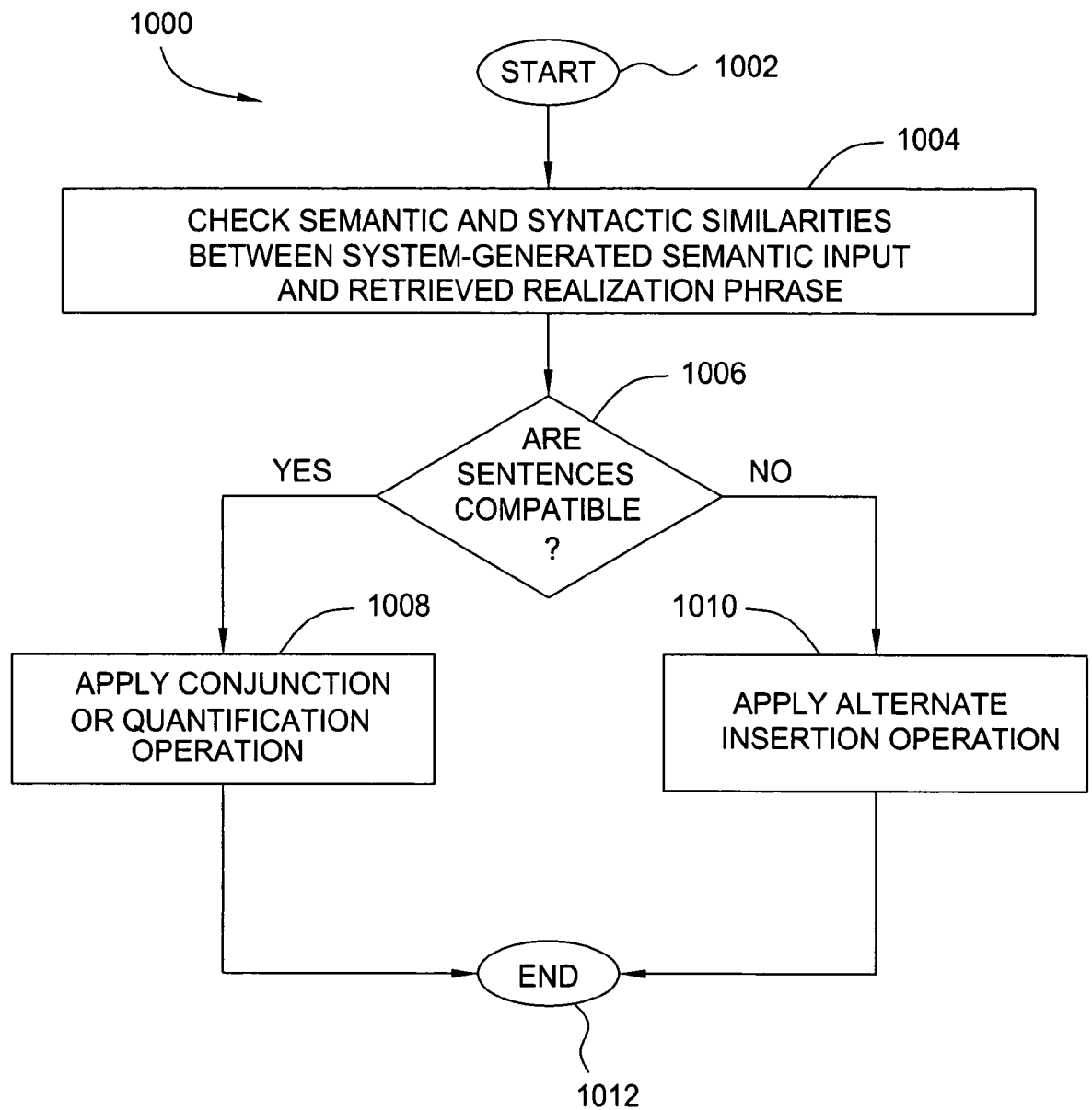
FIG. 10 is a flow diagram of one embodiment of a method for adapting a retrieved sentence by applying a paratactic insertion operator.

FIG. 10 is a flow diagram of one embodiment of a method 1000 for adapting a retrieved sentence, e.g., by applying a paratactic insertion operator. In one embodiment, the method 1000 is an aggregation operation. The method 1000 is initialized at step 1002 and proceeds to step 1004, where the method 1000 inspects the semantic and syntactic similarities between the system-generated semantic input and a retrieved realization phrase.

In step 1006, the method 1000 inquires whether the retrieved realization phrase and the system-generated semantic input are compatible such that the "new" proposition (e.g., the proposition contained in the system-generated semantic representation) can be merged into the realization tree of the retrieved sentence (e.g., as opposed to incorporating the new proposition in a separate sentence).

If the method 1000 determines in step 1006 that the retrieved realization phrase and the system-generated semantic input are compatible, the method 1000 proceeds to step 1008 and applies a conjunction (e.g., "The names of the school districts are Lakeland School District AND Panas School District") or a quantification (e.g., "THREE houses are Colonials. ONE is a Tudor") operator.

Alternatively, if the method 1000 determines in step 1006 that the retrieved realization phrase and the system-generated semantic input are not compatible, the method 1000 proceeds to step 1010 and applies an alternate insertion operator (a hypotactic operator in accordance with the method 800, for example). The method 1000 then terminates in step 1012.

In one embodiment, application of an insertion operator involves first applying a paratactic operator (e.g., in accordance with the method 700), which has more restrictive preconditions (e.g., because syntactic structures of entire sentences must be parallel in order to combine sentences), and then applying a hypotactic operator. In this way, less restrictive hypotactic operators will not prevent paratactic operators from being subsequently applied, and a variety of syntactic constructions can be generated for application toward the output sentence.

Figure 9:
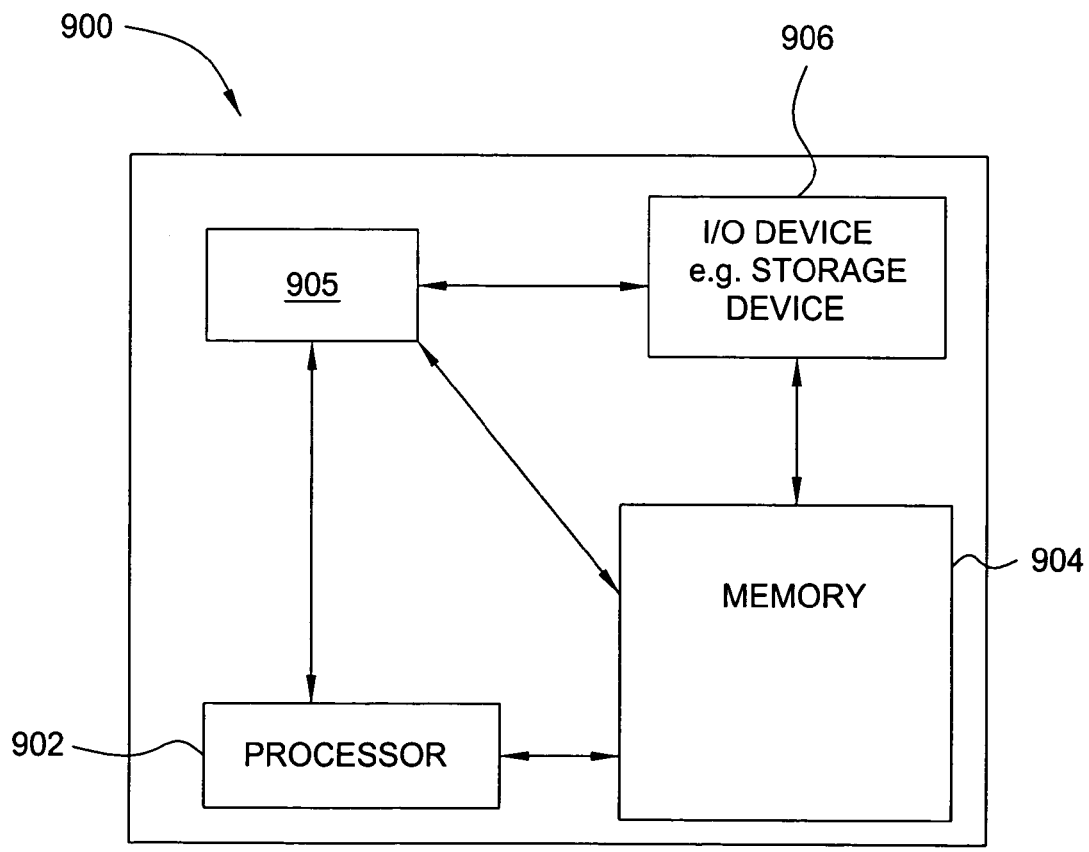
FIG. 9 is a high level block diagram of the natural language generation method that is implemented using a general purpose computing device.

FIG. 9 is a high level block diagram of the natural language generation method that is implemented using a general purpose computing device 900. In one embodiment, a general purpose computing device 900 comprises a processor 902, a memory 904, a language generation module 905 and various input/output (I/O) devices 906 such as a display, a keyboard, a mouse, a modem, and the like. In one embodiment, at least one I/O device is a storage device (e.g., a disk drive, an optical disk drive, a floppy disk drive). It should be understood that the language generation module 905 can be implemented as a physical device or subsystem that is coupled to a processor through a communication channel.

Alternatively, the language generation module 905 can be represented by one or more software applications (or even a combination of software and hardware, e.g., using Application Specific Integrated Circuits (ASIC)), where the software is loaded from a storage medium (e.g., I/O devices 406) and operated by the processor 902 in the memory 904 of the general purpose computing device 900. Thus, in one embodiment, the language generation module 905 for generating natural language phrases described herein with reference to the preceding Figures can be stored on a computer readable medium (e.g., RAM, magnetic or optical drive or diskette).

Thus, the present invention represents a significant advancement in the field of natural language generation systems. A method and apparatus are provided that enable the rapid generation of grammatically correct natural language sentences, e.g., for natural language responses to user queries. The method virtually "learns" natural language, e.g., in the manner a human would, by observing and analyzing grammatical relationships in training examples and by storing adapted examples for future use. Over time, accurate, grammatically correct results are generated more quickly and more efficiently.

While foregoing is directed to the preferred embodiment of the present invention, other and further embodiments of the invention may be devised without departing from the basic scope thereof, and the scope thereof is determined by the claims that follow.

The invention claimed is:

1. A method for generating a natural language sentence, said method comprising the steps of:

retrieving one or more stored sentences having semantic features similar to semantic features of a system-generated semantic representation, said retrieval being guided at least in part by an ease with which said one or more stored sentences are adapted to produce a grammatically correct output sentence, said retrieval comprising:

comparing a semantic representation of one of said one or more stored sentences with said system-generated semantic representation in order to assess a degree of similarity between said one of said one or more stored sentences and said system-generated semantic representation, wherein said degree of similarity is assessed by computing a similarity measure based on a distance between all propositions contained in said semantic representation of said one of said one or more stored sentences and all propositions contained within said system-generated semantic representation;

identifying one or more propositions contained in said semantic representation of said one of said one or more stored sentences that differ from one or more propositions contained in said system-generated semantic representation;

identifying one or more adaptation operators that may be applied to said one of said one or more stored sentences to produce a grammatically correct output sentence;

calculating an adaptation cost representing a likelihood that application of said one or more adaptation operators to said one of said one or more stored sentences will produce a grammatically correct output sentence; and adding said one of said one or more stored sentences to a list of retrieved sentences if said adaptation cost meets a predefined criterion; and applying one or more adaptation operators to one or more of said retrieved sentences in order to modify said retrieved sentences.

2. The method of claim 1, wherein said adaptation operators comprise one or more of the following: a null operator, a substitution operator, a deletion operator and an insertion operator.

3. The method of claim 2, wherein said null operator indicates that a semantic representation of a retrieved sentence and said system-generated semantic representation share an identical set of propositions.

4. The method of claim 2, wherein said substitution operator indicates that a proposition contained in a semantic representation of a retrieved sentence and a proposition contained in said system-generated semantic representation share a common relation, but have different values.

5. The method of claim 2, wherein said deletion operator indicates that a semantic representation of a retrieved sentence contains a proposition not contained in said system-generated semantic representation.

6. The method of claim 2, wherein said insertion operator indicates that said system-generated semantic representation contains a proposition not contained in a semantic representation of a retrieved sentence.

7. The method of claim 1, further comprising the step of:
saving a resultant sentence generated by modifying said one or more retrieved sentence as a new stored sentence.

8. The method of claim 7, wherein said saving step comprises:

applying one or more tests against said resultant sentence in order to determine said resultant sentence is fluent and grammatically correct; and permanently storing said resultant sentence if said resultant sentence is determined to be fluent and grammatically correct.

9. The method of claim 7, wherein said resultant sentence is saved if modifications made to a semantic representation of one of said one or more stored sentences in order to produce said resultant sentence are not trival.

10. The method of claim 9, wherein said modifications are not trival if adaptation operators applied to said one of said one or more stored sentences comprise at least one of a deletion operator or an insertion operator.

11. The method of claim 1, wherein said retrieving step further comprises:

ranking each of said retrieved sentences according to the ease with which each sentence may be adapted to produce a grammatically correct output sentence.

12. The method of claim 1, wherein said degree of similarity is assessed by computing an overlap of concepts between said semantic representation of said one of said one or more stored sentences and said system-generated semantic representation.

13. A computer readable storage medium containing an executable program for generating a natural language sentence the program causing a processor to perform the steps of:

retrieving one or more stored sentences having semantic features similar to semantic features of a system-generated semantic representation, said retrieval being guided at least in part by an ease with which said one or more stored sentences are adapted to produce a grammatically correct output sentence, said retrieval comprising:

comparing a semantic representation of one of said one or more stored sentences with said system-generated semantic representation in order to assess a degree of similarity between said one of said one or more stored sentences and said system-generated semantic representation, wherein said degree of similarity is assessed by computing a similarity measure based on a distance between all propositions contained in said semantic representation of said one of said one or more stored sentences and all propositions contained within said system-generated semantic representation;

identifying one or more propositions contained in said semantic representation of said one of said one or more stored sentences that differ from one or more propositions contained in said system-generated semantic representation;

identifying one or more adaptation operators that may be applied to said one of said one or more stored sentences to produce a grammatically correct output sentence;

calculating an adaptation cost representing a likelihood that application of said one or more adaptation operators to said one of said one or more stored sentences will produce a grammatically correct output sentence; and adding said one of said one or more stored sentences to a list of retrieved sentences if said adaptation cost meets a predefined criterion; and applying one or more adaptation operators to one or more of said retrieved sentences in order to modify said retrieved sentences.

14. The computer readable storage medium of claim 13, wherein said adaptation operators comprise one or more of the following: a null operator, a substitution operator, a deletion operator and an insertion operator.

15. The computer readable storage medium of claim 14, wherein said null operator indicates that a semantic representation of a retrieved sentence and said system-generated semantic representation share an identical set of propositions.

16. A computer readable storage medium of claim 14, wherein said substitution operator indicates that a propostion contained in a semantic representation of a retrieved sentence and a proposition contained in said system-generated semantic representation share a common relation, but have different value.

17. The computer readable storage medium of claim 14, wherein said deletion operator indicates that a semantic represention of a retrieved sentence contains a proposition not contained in said system-generated semantic representation.

18. The computer readable storage medium of claim 14, wherein said insertion operator indicates that said system-generated semantic representation contains a proposition not contained in a semantic representation of a retrieved sentence.

19. The computer readable storage medium of claim 13, further comprising the step of:

saving a resultant sentence generated by modifying said one or more retrieved sentence as a new stored sentence.

20. The computer readable storage medium of claim 19, wherein said saving step comprises:

applying one or more tests against said resultant sentence in order to determine said resultant sentence is fluent and grammatically correct; and permanently storing said resultant sentence if said resultant sentence is determined to be fluent and grammatically correct.

21. The computer readable storage medium of claim 19, wherein said resultant sentence is saved if modifications made to a semantic representation of one of said one or more stored sentences in order to produce said resultant sentence are not trivial.

22. The computer readable storage medium of claim 21, wherein said modifications are not trival if adaptation operators applied to said one of said one or more stored sentences comprise at least one of a deletion operator or an insertion operator.

23. The computer readable storage medium of claim 13, wherein said retrieving step comprises:

ranking each of said retrieved sentences according to the ease with which each sentence may be adapted to produce a grammatically correct output sentence.

24. The computer readable storage medium of claim 13, wherein said degree of similarity is assessed by computing an overlap of concepts between said semantic representation of said one of said one or more stored sentences and said system-generated semantic representation.

25. Apparatus for generation natural language response to a user query, said apparatus comprising:

means for retrieving one or more stored sentences having semantic features similar to semantic features of a system-generated semantic representation, said retrieval being guided at least in part by an ease with which said one or more stored sentences are adapted to produce a grammatically correct output sentence, said means for retrieval comprising:

means for comparing a semantic representation of a stored sentence with said system-generated semantic representation in order to assess a degree of similarity between one of said one or more stored sentences and said system-generated semantic representation, wherein said degree of similarity is assessed by computing a similarity measure based on a distance between all propositions contained in said semantic representation of said one of said one or more stored sentences and all propositions contained within said system-generated semantic representation;

means for identifying one or more propositions contained in said semantic representation of said one of said one or more stored sentences that differ from one or more propositions contained in said system-generated semantic representation;

means for identifying one or more adaptation operators that may be applied to said one of said one or more stored sentences to produce a grammatically correct output sentence;

means for calculating an adaptation cost representing a likelihood that application of said one or more adaptation operators to said one of said one or more stored sentences will produce a grammatically correct output sentence; and means for adding said one of said one or more stored sentences to a list of retrieved sentences is said adaptation cost meets a predefined criterion; and means for applying one or more adaptation operators to one or more of said retrieved sentences in order to modify said retrieved sentences.

* * * * *